United States Patent
Vagelos

(10) Patent No.: US 11,758,404 B2
(45) Date of Patent: *Sep. 12, 2023

(54) SYSTEM AND PROCESS FOR LOCKING A SUBSCRIBER IDENTITY MODULE (SIM) CARD TO A WIRELESS DEVICE

(71) Applicant: TracFone Wireless, Inc., Miami, FL (US)

(72) Inventor: Theodore Vagelos, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,994

(22) Filed: Oct. 20, 2020

(65) Prior Publication Data

US 2021/0037379 A1 Feb. 4, 2021

Related U.S. Application Data

(63) Continuation of application No. 16/398,906, filed on Apr. 30, 2019, now Pat. No. 10,812,970.

(Continued)

(51) Int. Cl.
*H04W 12/30* (2021.01)
*H04W 12/40* (2021.01)
(Continued)

(52) U.S. Cl.
CPC .......... *H04W 12/35* (2021.01); *H04W 12/40* (2021.01); *H04W 12/66* (2021.01); *H04W 12/71* (2021.01); *H04M 1/724* (2021.01); *H04W 8/245* (2013.01)

(58) Field of Classification Search
CPC ....... H04W 12/0023; H04W 12/00506; H04W 12/004; H04W 12/00512; H04W 8/245
(Continued)

(56) References Cited

U.S. PATENT DOCUMENTS 7,793,431 B2 9/2010 Yu
9,817,992 B1 * 11/2017 Paczkowski ............ H04L 63/08
(Continued)

FOREIGN PATENT DOCUMENTS

CN 106304033 A * 1/2017
KR 2006100086 A * 9/2006

OTHER PUBLICATIONS

Machine Translation of KR2006100086A (Year: 2006).*

*Primary Examiner* — German Viana Di Prisco

(57) ABSTRACT

The disclosure is directed to a device configured to implement a SIM lock to control network access associated with a wireless device. The device including a processor configured to interrogate a host wireless device and obtain a host wireless device identification from the host wireless device. The processor further configured to retrieve from a memory a stored wireless device identification, determine if a host wireless device identification matches the stored wireless device identification, prevent access of the host wireless device to network wireless services if the host wireless device identification does not match the stored wireless device identification, and enable access of the host wireless device to network wireless services if the host wireless device identification matches the stored wireless device identification. An associated process is also disclosed.

12 Claims, 7 Drawing Sheets

Related U.S. Application Data

(60) Provisional application No. 62/664,545, filed on Apr. 30, 2018.

(51) Int. Cl.
*H04W 12/60* (2021.01)
*H04W 12/71* (2021.01)
*H04W 8/24* (2009.01)
*H04M 1/724* (2021.01)

(58) Field of Classification Search
USPC .................................. 455/414.1, 418, 550.1
See application file for complete search history.

(56) References Cited

U.S. PATENT DOCUMENTS

| | | | |
|---|---|---|---|
| 10,044,714 B1 | 8/2018 | Gan et al. | |
| 2004/0014423 A1* | 1/2004 | Croome | H04L 63/08 455/41.2 |
| 2005/0020308 A1* | 1/2005 | Lai | H04W 12/08 455/558 |
| 2005/0108520 A1* | 5/2005 | Yamamoto | G06F 21/35 713/155 |
| 2008/0280644 A1* | 11/2008 | Hugot | H04L 63/0853 455/556.2 |
| 2009/0279682 A1 | 11/2009 | Strandell et al. | |
| 2009/0305668 A1* | 12/2009 | Ahn | H04W 12/12 455/410 |
| 2010/0030810 A1* | 2/2010 | Marr | G06F 16/29 709/217 |
| 2010/0095364 A1 | 4/2010 | Norgaard et al. | |
| 2010/0269156 A1 | 10/2010 | Hohlfeld et al. | |
| 2011/0086612 A1 | 4/2011 | Montz et al. | |
| 2011/0122813 A1* | 5/2011 | Choe | H04W 12/126 370/328 |
| 2012/0052832 A1 | 3/2012 | Bleckert et al. | |
| 2012/0094668 A1 | 4/2012 | Vratskides | |
| 2012/0157055 A1* | 6/2012 | Ren | H04M 1/67 455/411 |
| 2012/0225641 A1 | 9/2012 | Chen et al. | |
| 2012/0264400 A1* | 10/2012 | Khan | H04W 76/14 455/411 |
| 2012/0278857 A1* | 11/2012 | Merrien | H04W 12/06 726/3 |
| 2013/0157715 A1* | 6/2013 | Zheng | H04M 1/724 455/551 |
| 2013/0331063 A1 | 12/2013 | Cormier et al. | |
| 2015/0121506 A1 | 4/2015 | Cavanaugh | |
| 2016/0050195 A1* | 2/2016 | Nath | G06F 21/31 726/6 |
| 2016/0150413 A1* | 5/2016 | Meredith | H04W 12/06 455/410 |
| 2016/0165451 A1* | 6/2016 | Legris | H04W 48/02 455/410 |
| 2017/0148264 A1* | 5/2017 | Pichette | G06Q 20/123 |
| 2017/0325141 A1 | 11/2017 | Laliberte | |
| 2018/0007060 A1* | 1/2018 | Leblang | G06F 21/32 |
| 2018/0062853 A1 | 3/2018 | Li et al. | |
| 2018/0183655 A1 | 6/2018 | Gupta et al. | |
| 2018/0228098 A1 | 8/2018 | Nickerson et al. | |
| 2018/0255041 A1* | 9/2018 | Ashiya | H04L 9/3247 |
| 2018/0255042 A1* | 9/2018 | Ashiya | H04L 63/083 |
| 2018/0265040 A1 | 9/2018 | Nowottnick et al. | |
| 2018/0270363 A1* | 9/2018 | Guday | H04M 15/8083 |
| 2019/0014531 A1 | 1/2019 | Fang et al. | |
| 2019/0206164 A1 | 7/2019 | Chae et al. | |
| 2020/0053203 A1* | 2/2020 | Whynot | H04M 3/2218 |

* cited by examiner

SYSTEM AND PROCESS FOR LOCKING A SUBSCRIBER IDENTITY MODULE (SIM) CARD TO A WIRELESS DEVICE

CROSS-REFERENCE TO RELATED APPLICATIONS

This application is a continuation of U.S. application Ser. No. 16/398,906 filed on Apr. 30, 2019, now U.S. Pat. No. 10,812,970, issued on Oct. 20, 2020, which application claims the benefit from U.S. Provisional Application No. 62/664,545 filed on Apr. 30, 2018, which is hereby incorporated by reference in its entirety for all purposes as if fully set forth herein.

BACKGROUND OF THE DISCLOSURE

1. Field of the Disclosure

This disclosure relates generally to a system for locking a subscriber identity module (SIM) card to a wireless device. Moreover, this disclosure relates to a process for locking a subscriber identity module (SIM) card to a wireless device.

2. Related Art

Mobile device management (MDM) is an industry term for the administration of mobile devices, such as smartphones. MDM is typically implemented with the use of a third party product/service that has management features for mobile devices.

MDM is typically implemented by an organization (employer, company, and the like) and is a way to ensure employees stay productive and do not breach organization policies. Many organizations control mobile device activities of their employees using MDM products/services. MDM primarily deals with organization data segregation, securing emails, securing organization documents on devices, enforcing organization policies, integrating and managing mobile devices including laptops and handhelds of various categories, and/or the like.

MDM tools are typically utilized for both organization-owned and employee-owned devices across the enterprise or mobile devices owned by consumers. By controlling and protecting the data and configuration settings of all mobile devices in a network, MDM can reduce support costs, business risks, and the like. The intent of MDM is to optimize the functionality and security of a mobile communications while minimizing cost and downtime.

Collectively organizations are spending millions of dollars a year in MDM and other software to restrict activity on a mobile device only to find that the end user has removed the SIM from the authorized mobile device implementing MDM and installed the SIM in a non-authorized personal mobile device, which is not implementing MDM. Once the SIM is installed in the non-authorized personal mobile device, the MDM will typically no longer be able to control and protect the data, configuration settings, and the like in the non-authorized personal mobile device.

Additionally, numerous other devices utilize SIM cards for authorization to connect to wireless networks. For example, devices implementing Internet of things (IoT) technology may utilize SIM cards for wireless network access. The SIM cards in these other devices may be stolen and utilized in a personal mobile device.

Accordingly, there is a need for organizations to limit the ability for employees and others to utilize a SIM in a non-authorized personal mobile device.

SUMMARY OF THE DISCLOSURE

Aspects of the disclosure advantageously provide a device configured to implement a SIM lock to control network access associated with a wireless device, the device including a processor configured to interrogate a host wireless device and obtain a host wireless device identification from the host wireless device; the processor further configured to retrieve from a memory a stored wireless device identification; the processor further configured to determine if a host wireless device identification matches the stored wireless device identification; the processor further configured to prevent access of the host wireless device to network wireless services if the host wireless device identification does not match the stored wireless device identification; and the processor further configured to enable access of the host wireless device to network wireless services if the host wireless device identification matches the stored wireless device identification.

Aspects of the disclosure advantageously provide a process to implement a device that includes a SIM lock to control network access associated with a wireless device, the process including interrogating a host wireless device with a processor and obtain a host wireless device identification from the host wireless device; retrieving with the processor from a memory a stored wireless device identification; determining with the processor if a host wireless device identification matches the stored wireless device identification; preventing access of the host wireless device to network wireless services with the processor if the host wireless device identification does not match the stored wireless device identification; and enabling access of the host wireless device to network wireless services with the processor if the host wireless device identification matches the stored wireless device identification.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, processes, and systems for carrying out the several purposes of the disclosure. It is important, therefore, that the claims be regarded as including such equivalent constructions insofar as they do not depart from the spirit and scope of the disclosure.

DETAILED DESCRIPTION

In the description that follows, the disclosure may be described in reference to one or more aspects for providing a system and process for locking a subscriber identity module (SIM) card to a wireless device. In one aspect, once a SIM card implementing SIM Lock functionality as disclosed herein is inserted into a device for the first time, the SIM card can automatically read and store an electronic serial number of the wireless device or other identification in memory such that no additional systems are needed to store this value. If the SIM card that has a stored electronic serial number of the wireless device or other identification is ever inserted into another device and the device identification does not match the stored identification, the SIM will not allow a network connection. The disclosure, however, is not limited to any particular application nor is it limited by the examples described below. Various modifications to the disclosed aspects may be apparent to those skilled in the art and the general principles defined herein may be applied to other aspects and applications without departing from the spirit and scope of the disclosures. Therefore, the description of the aspects that follow are for purposes of illustration and not limitation.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not other aspects.

Figure 1:
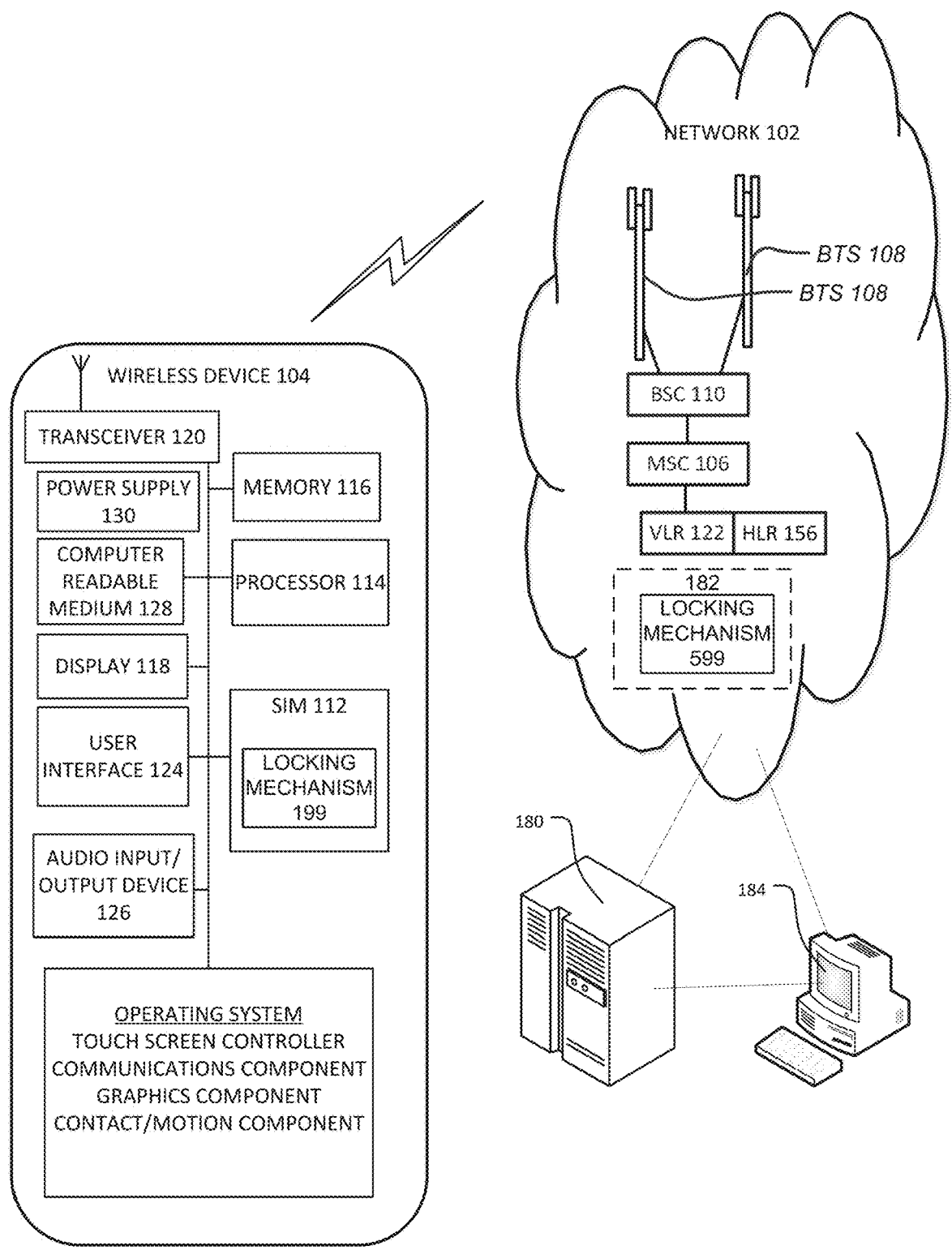
FIG. 1 illustrates details of an exemplary wireless device connected to an exemplary network in accordance with aspects of the disclosure.

FIG. 1 illustrates details of an exemplary wireless device connected to an exemplary network in accordance with aspects of the disclosure.

In this regard, a wireless device 104 is intended to encompass any compatible mobile technology computing device that connects to a wireless communication network and utilizes a UICC, SIM card, or the like, such as mobile phones, mobile equipment, mobile stations, user equipment, cellular phones, smartphones or the like (e.g., Apple iPhone, iPad, Google Android based devices, BlackBerry based devices, other types of PDAs or smartphones), wireless dongles, wireless access points, devices implemented as an Internet of things (IoT), or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone." Further, reference in this specification to a "wireless network" or "network" is intended to encompass any type of wireless network to provide wireless services through the use of a wireless device having a UICC, SIM card, or the like installed therein, through a Long Term Evolution (LTE) network, 5G network (5th generation mobile networks or 5th generation wireless systems), Global System for Mobile Communications (GSM) network, or any other network operating consistent with a protocol utilizing a communication channel as defined herein.

FIG. 1 shows the wireless device 104 implemented in a network in accordance with aspects of the disclosure. The wireless device 104 provides the radio and signal processing needed to access a wireless network 102 for services. The services may include data services, voice services, text-messaging services, and/or the like. The wireless network 102 may be a LTE, 5G, or GSM network or any other network operating consistent with a protocol utilizing a communication channel as defined herein. The wireless device 104 includes a processor 114, a memory 116, a display 118, a transceiver 120, a user interface 124, and the like. The processor 114 is configured to process call functions, provide other services to the user, and may also operate in conjunction with a SIM lock mechanism 199. It should be noted that the SIM lock mechanism 199 may be implemented by the subscriber identification module (SIM) 112, on dedicated hardware including semiconductors, application specific integrated circuits (ASIC), programmable logic arrays, other hardware devices including the processor 114 of the wireless device 104, and/or the like. The wireless device 104 may further include a user interface 124, an audio input/output device 126, a computer readable medium 128, and a power supply 130. Additionally, the wireless device 104 may implement an operating system, a touchscreen controller, a communications component, a graphics component, a contact/motion component, a mobile device management (MDM) software, and the like to provide full smartphone functionality.

In an exemplary aspect, a touchscreen may be implemented in the display 118 and may detect a presence and location of a touch of a user within the display area. For example, touching the display 118 of the wireless device 104 with a finger or hand. The touchscreen may also sense other passive objects, such as a stylus. The touchscreen may further include a touch screen controller.

In operation, the display 118 may show various objects associated with applications for execution by the processor 114. For example, a user may touch the display 118, particularly the touchscreen, to interact with the objects. That is, touching an object may execute an application in the processor 114 associated with the object that is stored in memory 116. Additionally or alternatively, touching an object may open a menu of options to be selected by the user. The display 118 may include a plurality of objects for the user to interact with. Moreover, the display 118 may include a plurality of screens. The display 118 showing one screen at a time. The user may interact with the display 118 to move a screen into view on the display 118. Various objects may be located in each of the screens.

The touchscreen may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The display 118 is generally configured to display a graphical user interface (GUI) that provides an easy to use visual interface between a user of the wireless device 104 and the operating system or application(s) running on the wireless device 104. Generally, the GUI presents programs, files, and operational options with graphical images. During operation, the user may select and activate various graphical images displayed on the display 118 in order to initiate functions and tasks associated therewith.

FIG. 1 further shows that the wireless network 102 may include a Mobile services Switching Center (MSC) 106 that may perform the switching of calls and that may include a Visitor Location Register (VLR) 122. The wireless network 102 may also include a Base Transceiver Station (BTS) 108 and a Base Station Controller (BSC) 110. The Base Transceiver Station 108 houses the radio transceivers that define a cell and handle the radio-link protocols with the wireless device 104. The Base Station Controller 110 manages the radio resources for one or more Base Transceiver Station 108. The Base Station Controller 110 is the connection between the wireless device 104 and the Mobile service Switching Center (MSC) 106.

A Home Location Register (HLR) 156 and the VLR 122 together with the MSC 106, provide the call-routing and roaming capabilities. The HLR 156 contains all the administrative information of each subscriber registered in the corresponding wireless network 102, along with the current location of the wireless device 104. The wireless device 104 may also be configured to connect to another type of wireless network on a communication channel as defined herein.

Figure 2:
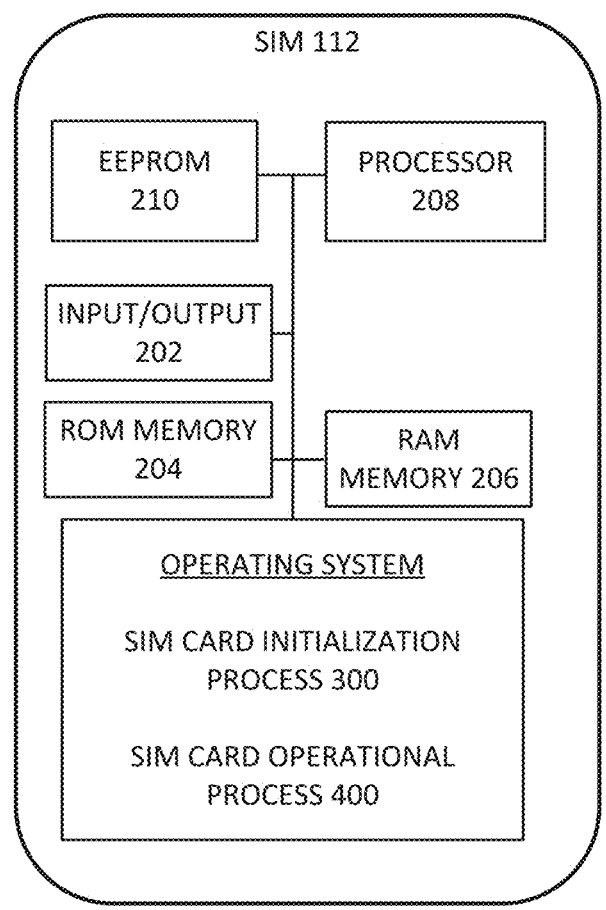
FIG. 2 illustrates a SIM card in accordance with aspects of the disclosure.

FIG. 2 illustrates a SIM card in accordance with aspects of the disclosure.

For brevity, any utilization of a UICC, a SIM card, or the like will be referred to as a SIM card. However, any similar structure implementing similar functionality is contemplated. The SIM card 112 may be associated with the wireless device 104. The SIM card 112 may be an integrated circuit that may store an International Mobile Subscriber Identity (IMSI) and also may store a key used to identify and authenticate subscribers on the wireless device 104. The SIM card 112 may also store network-specific information used to authenticate and identify subscribers on the wireless network 102. The network-specific information may include an Integrated Circuit Card Identifier (ICCID), Authentication Key (Ki), Local Area Identity (LAI), Operator-Specific Emergency Number, and so on. The SIM card 112 may also store other carrier-specific data such as the SMSC (Short Message Service Center) number, Service Provider Name (SPN), Service Dialing Numbers (SDN), Advice-Of-Charge parameters, Value Added Service (VAS) applications, and/or the like.

The SIM card 112 may include a SIM processor 208, input/output 202, SIM Random-Access Memory (RAM) 206, SIM Read-Only Memory (ROM) 204, SIM Electrically Erasable Programmable Read-Only Memory (EEPROM) 210, and the like. The SIM card 112 may be implemented as one or more of a full-size SIM (1FF), mini-SIM (2FF), micro-SIM (3FF), and nano-SIM (4FF).

The SIM card 112 may further include an operating system configured to store and provide network-specific information used to authenticate and identify subscribers on the network. The operating system may be stored in the SIM RAM 206, SIM ROM 204, the EEPROM 210, or the like.

The SIM card 112 may further include the SIM card initialization process 300 and/or the SIM card operational process 400. The SIM card initialization process 300 and/or SIM card operational process 400 may be stored in the SIM RAM 206, SIM ROM 204, the EEPROM 210, or the like. In some aspects, the SIM card initialization process 300 and/or the SIM card operational process 400 may be implemented by a SIM applet. In some aspects, the SIM card initialization process 300 and/or the SIM card operational process 400 may be implemented by software developed with a SIM Application Toolkit (STK). In some aspects, the SIM card initialization process 300 and/or the SIM card operational process 400 may be implemented consistent with 3GPP 31.111. In some aspects, the SIM card initialization process 300 and/or the SIM card operational process 400 may be implemented by the processor 114.

Ordinarily, the SIM card 112 may be configured to be transferred between different mobile devices. However, in accordance with the disclosure, the SIM lock mechanism 199 may be configured and implemented to prevent operation of the SIM card 112 in any other wireless device 104 other than the wireless device 104 that it has been paired to as described in further detail below. In particular, the SIM lock mechanism 199 may be configured and implemented to prevent operation of the SIM card 112 in any other wireless device 104 other than the first wireless device 104 that it is installed in. The SIM lock mechanism 199 may include the SIM card initialization process 300 and/or the SIM card operational process 400.

Figure 3:
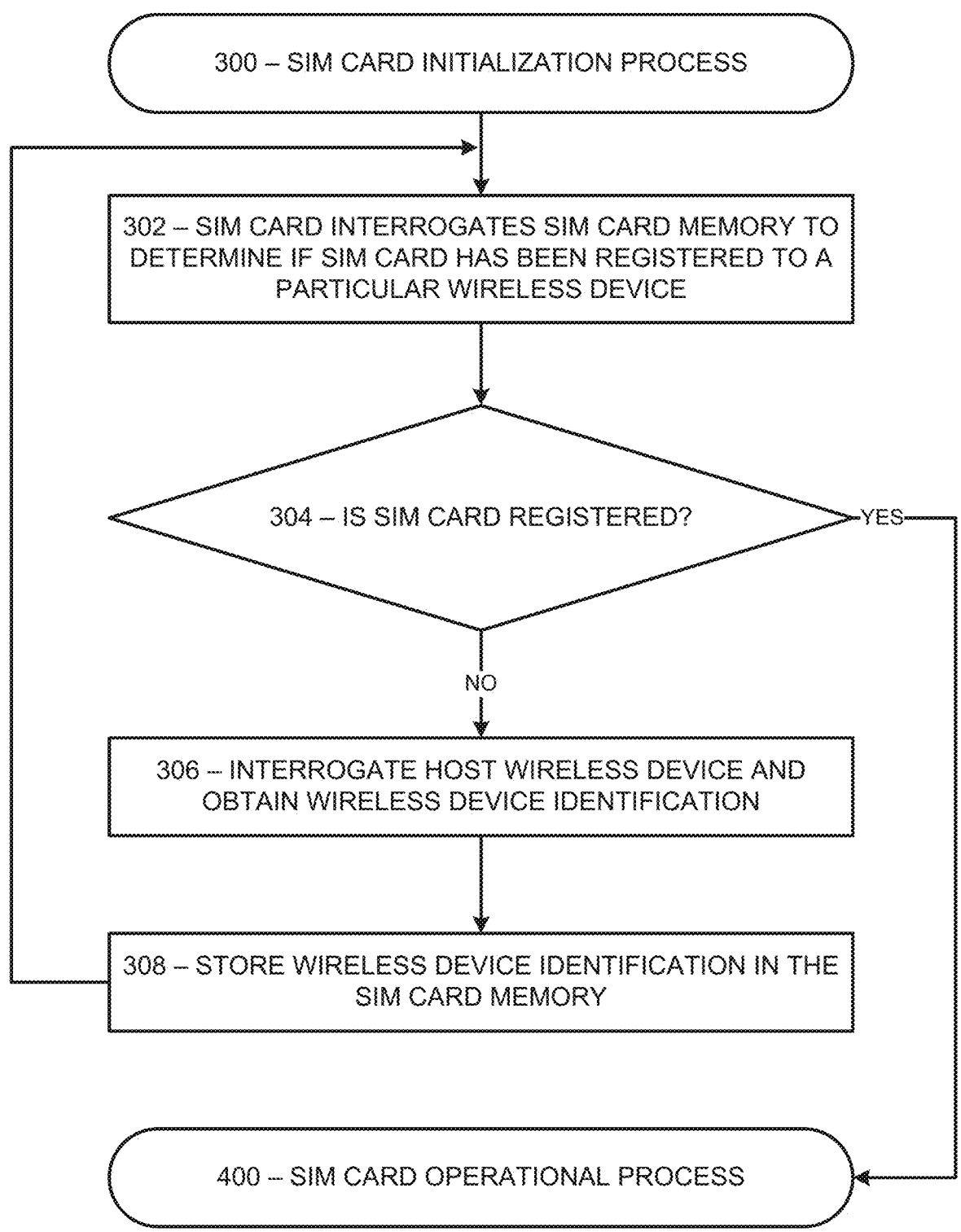
FIG. 3 illustrates a SIM card initialization process in accordance with aspects of the disclosure.

FIG. 3 illustrates a SIM card initialization process in accordance with aspects of the disclosure.

In particular, FIG. 3 illustrates a SIM card initialization process 300. More specifically, the SIM card initialization process 300 that may be part of the SIM lock mechanism 199 is configured and implemented to prevent operation of the SIM card 112 in any other wireless device 104 other than the wireless device 104 that it has been paired to as described in further detail below. The SIM card initialization process 300 as described below may be the first step in pairing the SIM card 112 to a particular wireless device 104 thus preventing the utilization of the SIM card 112 in any other wireless device 104. The SIM card initialization process 300 may be initiated at power up of the wireless device 104, periodically, or the like.

In block 302, the SIM card initialization process 300 operates the SIM card 112 to interrogate the SIM card memory to determine if the SIM card 112 has been registered to a particular wireless device 104. In this regard, the SIM card initialization process 300 may interrogate the SIM RAM 206, SIM ROM 204, the EEPROM 210, or the like to determine if a registration value has been stored. In one aspect, the registration value may be a flag indicating the pairing process has been completed. In other aspects, the registration value may be a mobile equipment identifier (MEID), an international Mobile Station Equipment Identity (IMEI) number, an Electronic Serial Number (ESN), a pseudo-ESN (pESN), or the like. Other registration values are contemplated as well as long as they identify that the SIM card initialization process 300 has been previously and completely implemented to pair a particular SIM card 112 to a particular wireless device 104.

In block 304, the SIM card initialization process 300 determines whether the SIM card 112 is registered based on the block 302 determination of a registration value. If the SIM card 112 has been registered, the SIM card initialization process 300 advances to block 400 to implement the SIM card operational process 400 illustrated in FIG. 4. If the SIM card 112 has not been registered, the SIM card initialization process 300 advances to block 306 as described below.

In block 306, the SIM card initialization process 300 may interrogate the host wireless device 104 that is currently implementing the SIM card 112. The result of the interrogation is to obtain wireless device identification of the host wireless device 104. The term host wireless device 104 is meant to describe a wireless device 104 in which the SIM card 112 is currently operating. The wireless device identification including a mobile equipment identifier (MEID), an international Mobile Station Equipment Identity (IMEI) number, an Electronic Serial Number (ESN), a pseudo-ESN (pESN), and/or the like of the host wireless device.

In block 308, the SIM card initialization process 300 may store the wireless device identification including the mobile equipment identifier (MEID), the international Mobile Station Equipment Identity (IMEI) number, the Electronic Serial Number (ESN), the pseudo-ESN (pESN), and/or the like in the SIM card memory. Additionally, the SIM card initialization process 300 may store a flag indicating that the SIM card initialization process 300 has been completed.

In some aspects, during the SIM card initialization process 300 a warning may be generated on the display 118 of the wireless device 104 indicating that the process is about to store the wireless device identification. This warning will allow a user to abort the storage process in the event that they are utilizing a SIM card in a device that is not desired for the process. Additionally, the warning may include the ability to generate a confirmation button for the user to confirm implementation of the SIM card initialization process 300. Additionally, the warning may include the ability to generate a cancel button for the user to cancel implementation of the SIM card initialization process 300.

In some aspects, during the SIM card initialization process 300 a confirmation message may be automatically sent from the wireless device 104 indicating that the process has stored the wireless device identification. This confirmation message will allow an organization to receive confirmation that the SIM card initialization process 300 has been implemented by the user. The confirmation message may be an email, SMS message, a database update, an update to a web-based portal, or the like that is sent or provided to a server 180 and/or a computer 184 associated with the organization, a customer, a MNO, a MVNO, and/or the like. The confirmation message may include the mobile equipment identifier (MEID), the international Mobile Station Equipment Identity (IMEI) number, the Electronic Serial Number (ESN), the pseudo-ESN (pESN), a phone number of the wireless device 104, or the like.

The portion of the SIM card memory storing the mobile equipment identifier (MEID), the international Mobile Station Equipment Identity (IMEI) number, the Electronic Serial Number (ESN), the pseudo-ESN (pESN), or the like may include the SIM RAM 206, SIM ROM 204, the EEPROM 210, or the like. Additionally, the SIM card memory storing this information may implement memory protection to prevent an unauthorized process from accessing and/or modifying the memory. For example, it would be undesirable if the SIM card memory could be hacked for unauthorized modification. The memory protection may include segmentation, paged virtual memory, protection keys, simulated segmentation, capability-based addressing, dynamic tainting, encryption, and/or the like.

Segmentation refers to dividing a computer's memory into segments. A reference to a memory location includes a value that identifies a segment and an offset within that segment.

In paging, the memory address space is divided into equal-sized blocks called pages. Using virtual memory hardware, each page can reside in any location of the computer's physical memory, or be flagged as being protected. Virtual memory makes it possible to have a linear virtual memory address space and to use it to access blocks fragmented over physical memory address space.

A memory protection key (MPK) may be a mechanism that divides physical memory into blocks of a particular size, each of which has an associated numerical value called a protection key. Each process also has a protection key value associated with it. On a memory access, the hardware checks that the current process's protection key matches the value associated with the memory block being accessed; if not, an exception occurs.

Simulation may be the use of a monitoring program to interpret the machine code instructions of some computer architectures. Such an instruction set simulator can provide memory protection by using a segmentation-like scheme and validating the target address and length of each instruction in real time before actually executing them. The simulator may calculate the target address and length and compare this against a list of valid address ranges that it holds concerning the thread's environment, such as any dynamic memory blocks acquired since the thread's inception, plus any valid shared static memory slots. The meaning of "valid" may change throughout the thread's life depending upon context. It may sometimes be allowed to alter a static block of storage, and sometimes not, depending upon the current mode of execution, which may or may not depend on a storage key or supervisor state.

Capability-based addressing may use pointers that are replaced by protected objects (called capabilities) that can only be created using privileged instructions, which may only be executed, by the kernel, or some other process authorized to do so. This effectively lets the kernel control, which processes may access which objects in memory, with no need to use separate address spaces or context switches.

Dynamic tainting may be utilized for protecting programs from illegal memory accesses. When memory is allocated, at runtime, this technique taints both the memory and the corresponding pointer using the same taint mark. Taint marks are then suitably propagated while the program executes and are checked every time a memory address m is accessed through a pointer p. If the taint marks associated with m and p differ, the execution is stopped and the illegal access is reported.

Encryption may include a process of encoding data and/or the like in such a way that only authorized parties can access it and those who are not authorized cannot. In one aspect, the encryption may include an encryption scheme, the intended information or message, referred to as plaintext, is encrypted using an encryption algorithm, which may be a cipher, generating ciphertext that can be read only if decrypted. In one aspect, the encryption scheme may use a pseudo-random encryption key generated by an algorithm.

Figure 4:
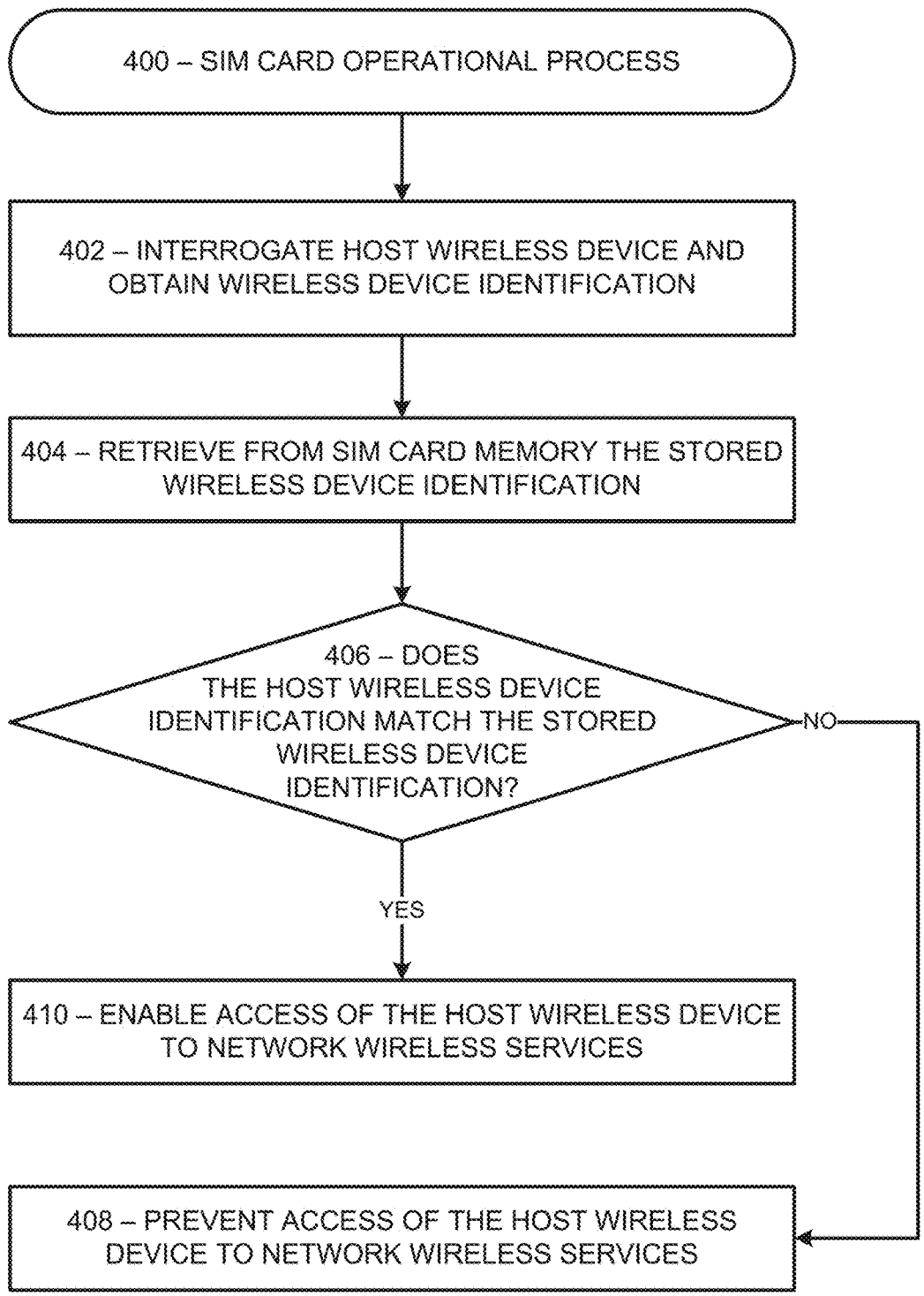
FIG. 4 illustrates a SIM card operational process in accordance with aspects of the disclosure.

FIG. 4 illustrates a SIM card operational process in accordance with aspects of the disclosure.

In particular, FIG. 4 illustrates a SIM card operational process 400. More specifically, the SIM card operational process 400 may be part of the SIM lock mechanism 199 configured and implemented to prevent operation of the SIM card 112 in any other wireless device 104 other than the wireless device 104 that it has been paired to as described in further detail below. The SIM card operational process 400 as described below is the second step in preventing the utilization of the SIM card 112 in any other wireless device 104. The SIM card operational process 400 may be initiated at power up of the wireless device 104, periodically, or the like.

In block 402, the SIM card operational process 400 may interrogate a host wireless device and obtain wireless device identification. The wireless device identification may include the mobile equipment identifier (MEID), the international Mobile Station Equipment Identity (IMEI) number, the Electronic Serial Number (ESN), the pseudo-ESN (pESN), and/or the like.

In block 404, the SIM card operational process 400 may retrieve from SIM card memory the stored wireless device identification. The wireless device identification may include the mobile equipment identifier (MEID), the international Mobile Station Equipment Identity (IMEI) number, the Electronic Serial Number (ESN), the pseudo-ESN (pESN), and/or the like.

In block 406, the SIM card operational process 400 may determine if the host wireless device identification matches the stored wireless device identification. If the host wireless device identification matches the stored wireless device identification, then the process advances to block 410. On the other hand, if the host wireless device identification does not match the stored wireless device identification, then the process advances to block 408.

In block 408, the SIM card operational process 400 has determined that the host wireless device identification does not match the stored wireless device identification. In response to this determination, in block 408 the SIM card operational process 400 prevents access of the host wireless device 104 to network wireless services. For example, the SIM card operational process 400 may prevent access or loading of one or more of an International Mobile Subscriber Identity (IMSI), network-specific information used to authenticate and identify subscribers on the wireless network 102, an Integrated Circuit Card Identifier (ICCID), Authentication Key (Ki), Local Area Identity (LAI), Operator-Specific Emergency Number, the SMSC (Short Message Service Center) number, Service Provider Name (SPN), Service Dialing Numbers (SDN), Advice-Of-Charge parameters, Value Added Service (VAS) applications, and/or the like.

In some aspects, if the host wireless device identification does not match the stored wireless device identification, then the SIM card operational process 400 may generate a warning that may be displayed on the display 118 of the wireless device 104 indicating that the SIM card 112 is currently in an unauthorized device.

In some aspects, if the host wireless device identification does not match the stored wireless device identification, then the SIM card operational process 400 may generate and send a warning message over a communication channel as defined herein to the server 180 and/or the computer 184 indicating that the SIM card 112 is currently in an unauthorized device. This warning message will allow an organization to receive a warning that the SIM card 112 is currently in an unauthorized device. The warning message may be an email, SMS message, a database update, update to a web-based portal, or the like. The warning message may be sent to a server 180 and/or the computer 184 associated with the organization, a customer, a MNO, a MVNO, and/or the like. In another aspect, the warning message may be provided to a web portal implemented or accessible by a server 180 and/or the computer 184 associated with the organization, a customer, a MNO, a MVNO, and/or the like. The warning message may include the mobile equipment identifier (MEID), the international Mobile Station Equipment Identity (IMEI) number, the Electronic Serial Number (ESN), the pseudo-ESN (pESN), phone number of the wireless device 104, or the like.

In block 410, the SIM card operational process 400 has determined that the host wireless device identification does match the stored wireless device identification. In response to this determination, in block 410 the SIM card operational process 400 enables access of the host wireless device to network wireless services. For example, the SIM card operational process 400 may allow access or loading of an International Mobile Subscriber Identity (IMSI), network-specific information used to authenticate and identify subscribers on the wireless network 102, an Integrated Circuit Card Identifier (ICCID), Authentication Key (Ki), Local Area Identity (LAI), Operator-Specific Emergency Number, the SMSC (Short Message Service Center) number, Service Provider Name (SPN), Service Dialing Numbers (SDN), Advice-Of-Charge parameters, Value Added Service (VAS) applications, and/or the like.

Accordingly, the SIM card operational process 400 determines whether the host wireless device identification does or does not match the stored wireless device identification. If the host wireless device identification does match the stored wireless device identification, then the user has not moved the SIM card 112 to an unauthorized wireless device 104. Thus, an organization can have a high level of assurance that the wireless device 104 and its associated MDM will protect the organization.

On the other hand, if the host wireless device identification does not match the stored wireless device identification, then the user has likely moved the SIM card 112 to an unauthorized wireless device 104. Thus, an organization can have a high level of assurance that the wireless device 104 will not gain access to network services and use of the wireless device 104 is limited to protect the organization.

In one aspect, the SIM lock mechanism 199, the SIM card initialization process 300, the SIM card operational process 400 may be implemented entirely in the SIM card 112 and executed by the SIM processor 208. In one aspect, the SIM lock mechanism 199, the SIM card initialization process 300, the SIM card operational process 400 may be loaded in the SIM card 112 during manufacture. In one aspect, the SIM lock mechanism 199, the SIM card initialization process 300, the SIM card operational process 400 may be loaded in the SIM card 112 by a carrier. In one aspect, the SIM lock mechanism 199, the SIM card initialization process 300, the SIM card operational process 400 may be loaded in the SIM card 112 by an organization. Additionally, the SIM lock mechanism 199, the SIM card initialization process 300, and the SIM card operational process 400 may be loaded in the SIM card 112 by a computer system. The computer system may include dedicated hardware implementations including, but not limited to, PCs, PDAs, semiconductors, application specific integrated circuits (ASIC), programmable logic arrays, cloud computing devices, and other hardware devices constructed to install the SIM lock mechanism 199 into a SIM card 112.

In one aspect, the SIM lock mechanism 199, the SIM card initialization process 300, the SIM card operational process 400 may be partially implemented in the SIM card 112 and partially executed by the SIM processor 208. In one aspect, the SIM lock mechanism 199, the SIM card initialization process 300, the SIM card operational process 400 may be partially implemented in the wireless device 104 by the processor 114. In one aspect, the SIM lock mechanism 199, the SIM card initialization process 300, the SIM card operational process 400 may be entirely implemented in the wireless device 104 by the processor 114.

In one aspect, the SIM lock mechanism 199, the SIM card initialization process 300, the SIM card operational process 400 may be partially implemented by an MDM product in the wireless device 104 by the processor 114. In this regard, the MDM may subsequently access the SIM card 112 and install the SIM lock mechanism 199, the SIM card initialization process 300, and the SIM card operational process 400 on the SIM card 112.

The wireless device 104, may install the SIM lock mechanism 199 using various processes including, but not limited to, a network Over-the-air (OTA) installation, which can be initiated by the organization, a customer, a MNO, a MVNO, and/or the like. The OTA may be initiated and/or controlled by server or a web-based portal.

The SIM card 112 may be further configured with hardware fuses. The hardware fuses may include a variety of fuse technologies that are suitable for programmable key storage and/or the like. The hardware fuses may be programmed using laser or electrical programming processes. In one aspect, the hardware fuses may include laser fuses that may be programmed at probe. In one aspect, the hardware fuses may be implemented as eFuses that may be programmed using on-chip charge pumps, which permit the hardware fuses to be configured at probe, final test, and end product production. The hardware fuses may be activated in the event of tampering with the SIM lock mechanism 199.

The SIM card 112 may be further configured with crypto/security engines. The crypto/security engines may be implemented as a secure cryptoprocessor. In one aspect, the secure cryptoprocessor may be a dedicated computer or microprocessor for carrying out cryptographic operations. The secure cryptoprocessor may be embedded in a packaging with multiple physical security measures in the SIM card 112, which give it a degree of tamper resistance. The secure cryptoprocessor may be configured to not output decrypted data or decrypted program instructions in an environment where security cannot always be maintained.

The SIM card 112 memory may further include an encrypted memory portion. The encrypted memory portion may include a plurality of secure data blocks. The memory may further include a replay protected memory block (RPMB). The RPMB may provide an area that allows a portion of memory to be accessed with a hidden security key or trusted security function. The RPMB may provide secure storage for the host to protect crucial programs or data, as well as enable copy protection. The RPMB may include a plurality of secure data blocks. Other types of memory are contemplated as well. The memory may further be configured as a secure memory in regards to secure execution in DDR/RAM via memory areas reserved and/or shared by the SIM card 112 enforced by the SIM card 112 via secure MPUs (Memory Protection Units) in a secure manner and in regards to secure storage in eMMC/Flash via hardware based encryption, integrity, and/or access mechanisms in dedicated partitions such as a baseband file system partition and/or a Replay Protected Memory Block (RPMB) partition.

In one aspect, each lock of the SIM lock mechanism 199 may be configured with one or more states, one or more configurations, and one or more parameters. The states, configurations, and/or parameters may be secure stored and accessed in secure data blocks of the encrypted memory portion, the RPMB, and/or the like.

The SIM lock mechanism 199 may include utilizing a network Over the Air (OTA) process such as an OTA HLOS client. OTA refers to various processes of distributing and/or installing new software, new software updates, configuration settings, updating encryption keys and the like to the wireless device 104 and/or the SIM card 112. In one aspect, OTA refers to installing the SIM lock mechanism 199. The OTA process may include over-the-air service provisioning (OTASP), over-the-air provisioning (OTAP), over-the-air parameter administration (OTAPA), and the like for the wireless device 104 and/or the SIM card 112 with the necessary installation, update, configuration settings, and the like for the SIM lock mechanism 199.

The SIM lock mechanism 199 may include tamper detection feature to help proactively detect and take action against fraudulent unauthorized unlocking and/or hacking activity. This feature may be securely residing in a secure system within the SIM card 112 of the wireless device 104. The tamper detection feature may transparently run to monitor a security profile of the wireless device 104 as well as critical security data related to the SIM lock mechanism 199 implemented on the wireless device 104 and/or the SIM card 112. The scope of the tamper detection feature may involve monitoring of volatile as well as non-volatile memory, such as the memory blocks and the memory 116, the SIM RAM 206, the SIM ROM 204, the EEPROM 210, or the like. The tamper detection feature may take appropriate action once tamper has been detected including but not limited to blowing dedicated hardware fuses, such as tamper e-fuses, reporting of tampering activity over a communication channel for threat intelligence purposes as well as removing the ability to unlock the SIM lock mechanism 199. The tamper detection feature may deter fraudulent users and/or hackers and moreover help maintain revenue, subsidy, and/or intellectual property as well as help generate the threat intelligence retrieved in order to enhance the implementation of the SIM lock mechanism 199.

In one or more aspects, the SIM lock mechanism 199 may have a secure default lock state via utilization of dedicated secure state hardware e-fuse(s). This secure default lock state may allow the SIM lock mechanism 199 to more accurately determine tampering and effectively address the same.

Figure 5:
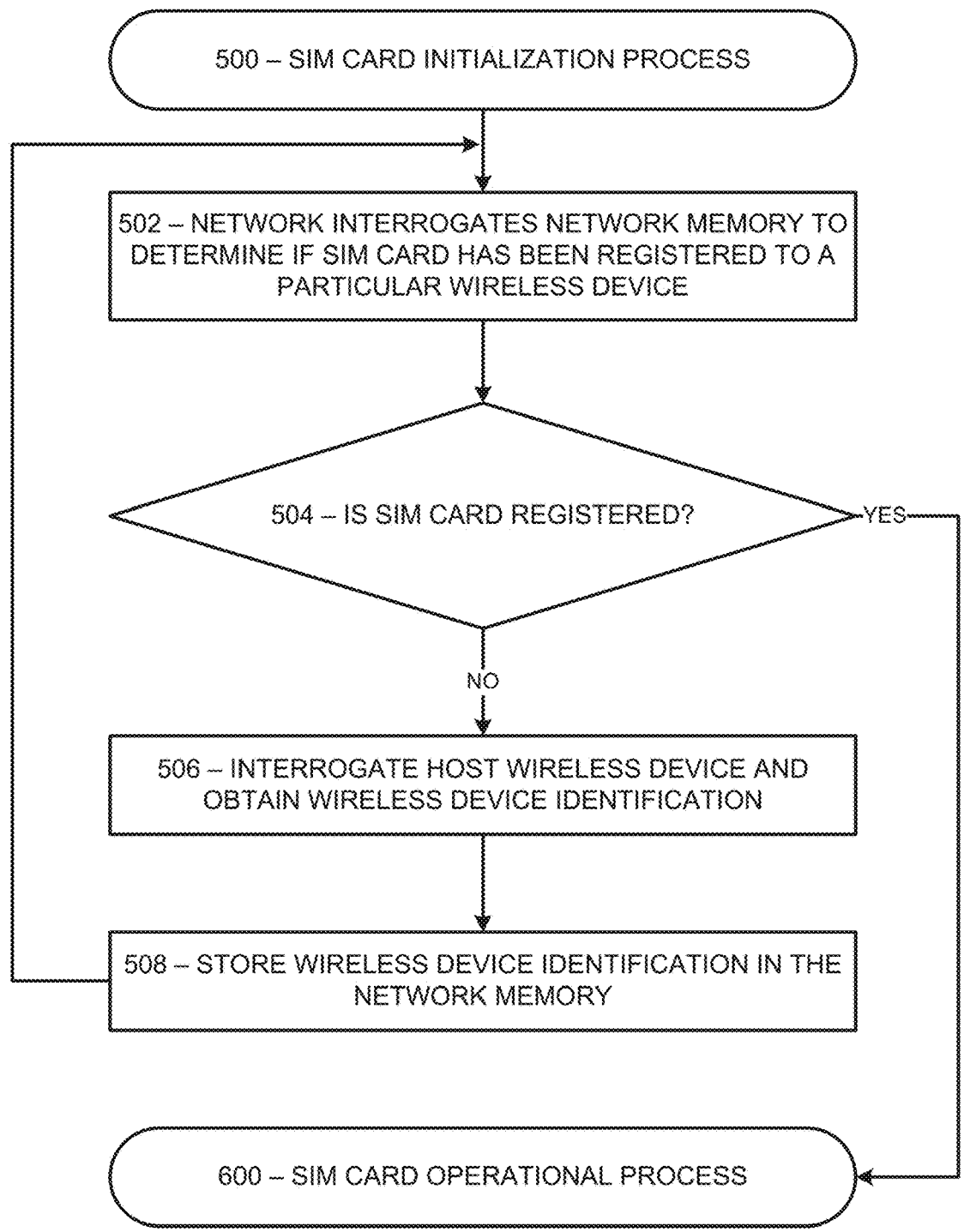
FIG. 5 illustrates a SIM card initialization process in accordance with aspects of the disclosure.

FIG. 5 illustrates a SIM card initialization process in accordance with aspects of the disclosure.

In particular, FIG. 5 illustrates a SIM card initialization process 500 implemented by a network. In one or more aspects, the network may include a MNO network, MVNO network, or the like. In one or more aspects, the network may implement a server to implement the SIM card initialization process 500. In one aspect, the SIM card initialization process 500 may be part of the SIM lock mechanism 599 configured and implemented to prevent operation of the SIM card 112 in any other wireless device 104 other than the wireless device 104 that it has been paired to as described in further detail below. The SIM card initialization process 500 as described below is the first step in pairing the SIM card 112 to a particular wireless device 104 thus preventing the utilization of the SIM card 112 in any other wireless device 104. The SIM card initialization process 500 may be initiated at power up of the wireless device 104, periodically, or the like.

In block 502, the SIM card initialization process 500 operates to determine if the SIM card 112 has been registered to a particular wireless device 104. In this regard, the SIM card initialization process 500 may interrogate a network memory, or the like to determine if a registration value has been stored. In one aspect, the registration value may be a flag indicating the pairing process has been completed. In other aspects, the registration value may be a mobile equipment identifier (MEID), an international Mobile Station Equipment Identity (IMEI) number, an Electronic Serial Number (ESN), a pseudo-ESN (pESN), or the like. Other registration values are contemplated as well as long as they identify that the SIM card initialization process 500 has been previously and completely implemented to pair a particular SIM card 112 to a particular wireless device 104.

In block 504, the SIM card initialization process 500 determines whether the SIM card 112 is registered based on the block 502 determination of a registration value. If the SIM card 112 has been registered, the SIM card initialization process 500 advances to block 600 to implement the SIM card operational process 600 illustrated in FIG. 6. If the SIM card 112 has not been registered, the SIM card initialization process 500 advances to block 506 as described below.

In block 506, the SIM card initialization process 500 may interrogate the host wireless device 104 that is currently implementing the SIM card 112. The result of the interrogation is to obtain wireless device identification of the host wireless device 104. The term host wireless device 104 is meant to describe a wireless device 104 in which the SIM card 112 is currently operating. The wireless device identification including a mobile equipment identifier (MEID), an international Mobile Station Equipment Identity (IMEI) number, an Electronic Serial Number (ESN), a pseudo-ESN (pESN), and/or the like of the host wireless device.

In block 508, the SIM card initialization process 500 may store the wireless device identification including the mobile equipment identifier (MEID), the international Mobile Station Equipment Identity (IMEI) number, the Electronic Serial Number (ESN), the pseudo-ESN (pESN), and/or the like in the network memory. Additionally, the SIM card initialization process 500 may store a flag indicating that the SIM card initialization process 500 has been completed.

In some aspects, during the SIM card initialization process 500 a confirmation message may be automatically sent from the wireless device 104 indicating that the process has stored the wireless device identification. This confirmation message will allow an organization to receive confirmation that the SIM card initialization process 500 has been implemented. The confirmation message may be an email, SMS message, a database update, an update to a web-based portal, or the like that is sent or provided to a server 180 and/or a computer 184 associated with the organization, a customer, a MNO, a MVNO, and/or the like. The confirmation message may include the mobile equipment identifier (MEID), the international Mobile Station Equipment Identity (IMEI) number, the Electronic Serial Number (ESN), the pseudo-ESN (pESN), a phone number of the wireless device 104, or the like.

Figure 6:
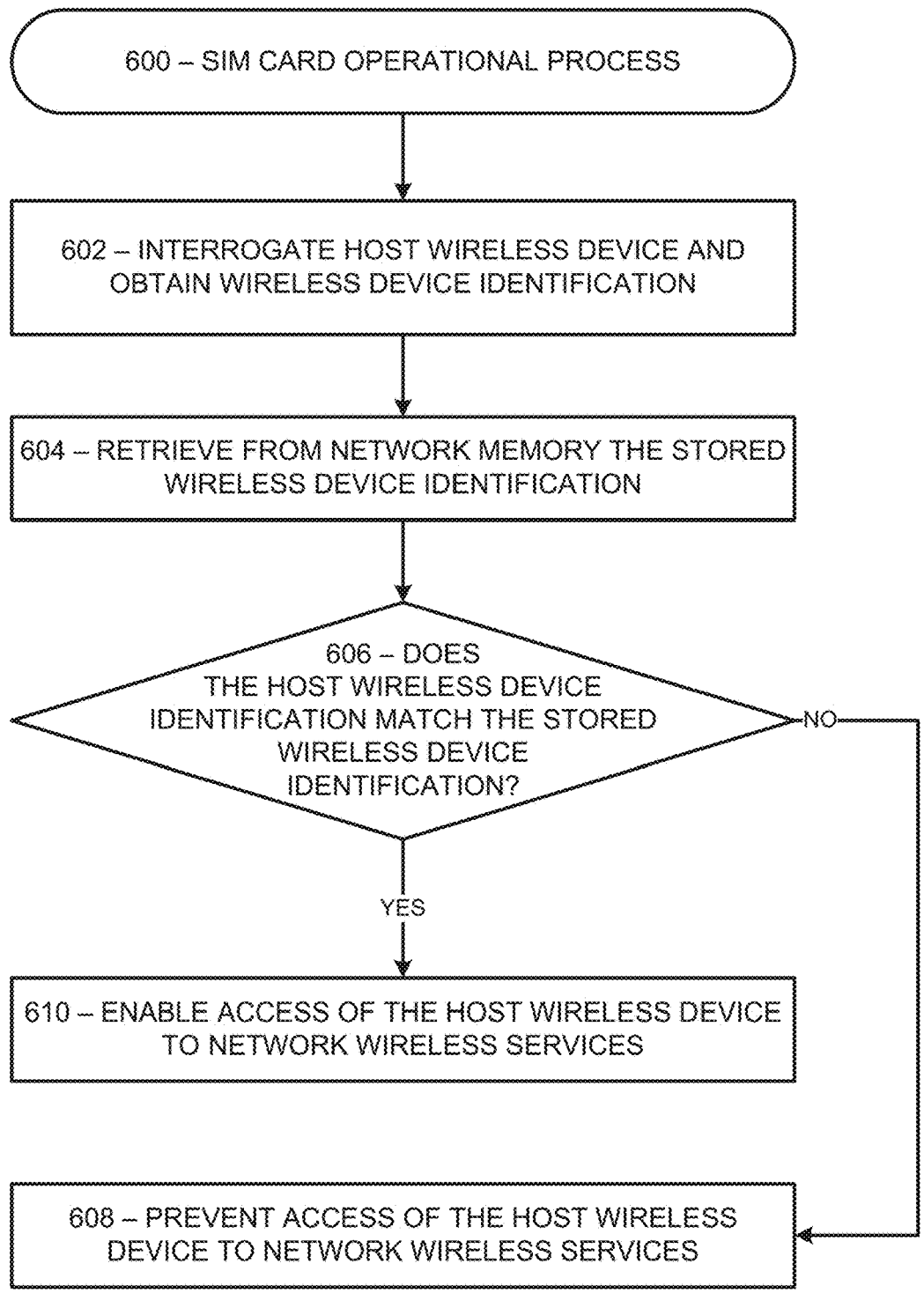
FIG. 6 illustrates a SIM card operational process in accordance with aspects of the disclosure.

FIG. 6 illustrates a SIM card operational process in accordance with aspects of the disclosure.

In particular, FIG. 6 illustrates a SIM card operational process 600. More specifically, the SIM card operational process 600 may be part of the SIM lock mechanism 599 configured and implemented to prevent operation of the SIM card 112 in any other wireless device 104 other than the wireless device 104 that it has been paired to as described in further detail below. In one or more aspects, the network may implement a server 182 to implement the SIM card operational process 600. The SIM card operational process 600 as described below is the second step in preventing the utilization of the SIM card 112 in any other wireless device 104. The SIM card operational process 600 may be initiated at power up of the wireless device 104, periodically, or the like.

In block 602, the SIM card operational process 600 may interrogate a host wireless device and obtain wireless device identification. The wireless device identification may include the mobile equipment identifier (MEID), the international Mobile Station Equipment Identity (IMEI) number, the Electronic Serial Number (ESN), the pseudo-ESN (pESN), and/or the like.

In block 604, the SIM card operational process 600 may retrieve from the network memory the stored wireless device identification. The wireless device identification may include the mobile equipment identifier (MEID), the international Mobile Station Equipment Identity (IMEI) number, the Electronic Serial Number (ESN), the pseudo-ESN (pESN), and/or the like.

In block 606, the SIM card operational process 600 may determine if the host wireless device identification matches the stored wireless device identification. If the host wireless device identification matches the stored wireless device identification, then the process advances to block 610. On the other hand, if the host wireless device identification does not match the stored wireless device identification, then the process advances to block 608.

In block 608, the SIM card operational process 600 has determined that the host wireless device identification does not match the stored wireless device identification. In response to this determination, in block 608 the SIM card operational process 600 prevents access of the host wireless device 104 to network wireless services.

In some aspects, if the host wireless device identification does not match the stored wireless device identification, then the SIM card operational process 600 may generate and send a warning message over a communication channel as defined herein indicating that the SIM card 112 is currently in an unauthorized device. This warning message will allow an organization to receive a warning that the SIM card 112 is currently in an unauthorized device. The warning message may be an email, SMS message, a database update, update to a web-based portal, or the like. The warning message may be sent or provided to a server 180 and/or computer 184 associated with the organization, a customer, a MNO, a MVNO, and/or the like. In another aspect, the warning message may be provided to a web portal implemented or accessible by a server 180 and/or the computer 184 associated with the organization, a customer, a MNO, a MVNO, and/or the like. The warning message may include the mobile equipment identifier (MEID), the international Mobile Station Equipment Identity (IMEI) number, the Electronic Serial Number (ESN), the pseudo-ESN (pESN), phone number of the wireless device 104, or the like.

In block 610, the SIM card operational process 600 has determined that the host wireless device identification does match the stored wireless device identification. In response to this determination, in block 610 the SIM card operational process 600 enables access of the host wireless device to network wireless services.

Accordingly, the SIM card operational process 600 determines whether the host wireless device identification does or does not match the stored wireless device identification. If the host wireless device identification does match the stored wireless device identification, then the user has not moved the SIM card 112 to an unauthorized wireless device 104. Thus, an organization can have a high level of assurance that the wireless device 104 and its associated MDM will protect the organization.

On the other hand, if the host wireless device identification does not match the stored wireless device identification, then the user has likely moved the SIM card 112 to an unauthorized wireless device 104. Thus, an organization can have a high level of assurance that the wireless device 104 will not gain access to network services and use of the wireless device 104 is limited to protect the organization.

Figure 7:
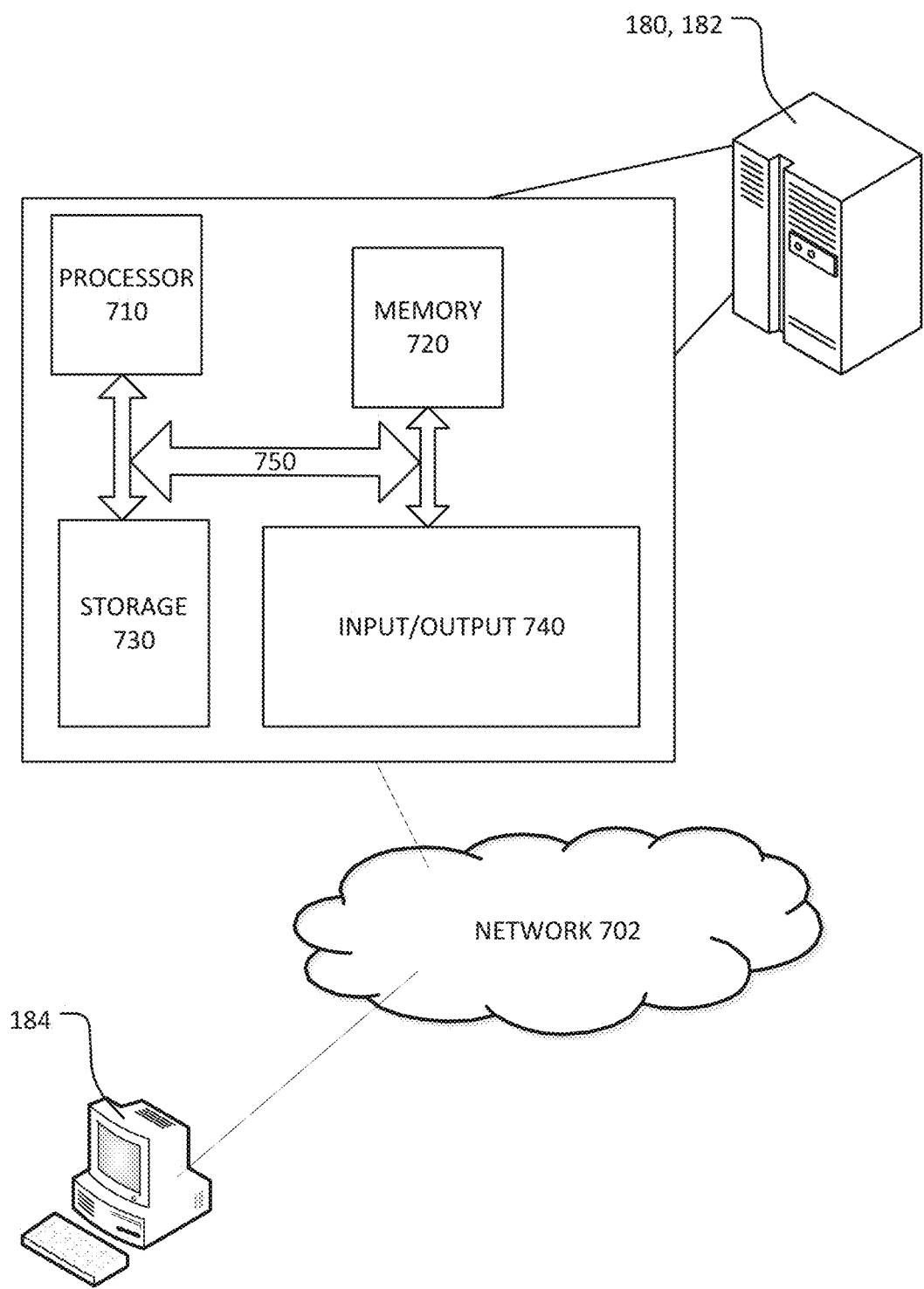
FIG. 7 illustrates a schematic diagram of a server in accordance with aspects of the disclosure.

FIG. 7 illustrates a schematic diagram of a server in accordance with aspects of the disclosure. In particular, FIG. 7 shows a server 180, 182 that may be implemented as a computer system. In particular, the server 180, 182 may operate to provide some or all of the services and functionality as described herein. The server 180, 182 may include a processor 710, a memory 720, a storage device 730, and an input/output device 740. Each of the processor 710, the memory 720, the storage device 730, and the input/output device 740 can, for example, be interconnected using a system bus 750. The processor 710 is capable of processing instructions for execution within the server 180, 182. In one implementation, the processor 710 is a single-threaded processor. In another implementation, the processor 710 is a multi-threaded processor. The processor 710 is capable of processing instructions stored in the memory 720 or on the storage device 730. In some embodiments, a parallel processing set of servers 180, 182 connected over a network may be employed, clustered into one or more server centers.

The memory 720 stores information within the server 180, 182. In one implementation, the memory 720 is a computer-readable medium. In one implementation, the memory 720 is a volatile memory unit. In another implementation, the memory 720 is a non-volatile memory unit. The storage device 730 is capable of providing mass storage for the server 180, 182. In one implementation, the storage device 730 is a computer-readable medium. In various different implementations, the storage device 730 can, for example, include a hard disk device, an optical disk device, or some other large capacity storage device. The input/output device 740 provides input/output operations for the server 180, 182 and may include the ability to communicate over a network 702 such as the Internet. Moreover, the input/output device 740 may communicate with the computer 184 associated with the organization, a customer, a MNO, a MVNO, and/or the like.

In aspects of the disclosure, the wireless device 104 may implement the mobile device management (MDM) software. The MDM software may include on-device applications and configurations, corporate policies and certificates, and backend infrastructure, for the purpose of simplifying and enhancing the IT management of the wireless device 104. The MDM software may be configured to increase device supportability, security, and corporate functionality while maintaining some user flexibility.

In one or more aspects, the MDM software may implement corporate data segregation, secure emails, secure corporate documents on devices, enforce corporate policies, integrate, and manage the wireless device 104.

In one or more aspects, the MDM software may be configured to ensure that diverse user equipment is configured to a consistent standard/supported set of applications, functions, or corporate policies. In one or more aspects, the MDM software may be configured to monitor and track equipment (e.g. location, status, ownership, activity). In one or more aspects, the MDM software may include over-the-air distribution of applications, data, and configuration settings for all types of devices.

The wireless network 102 may include a radio access network (RAN). The RAN may be implemented as part of a mobile telecommunication system of the wireless network 102. The RAN may implement a radio access technology. The RAN may provide a connection to a core network (CN) for the wireless device 104.

In some aspects, the wireless network 102 may include a Mobility Management Entity (MME). The MME may function as a key control-node. The MME may be responsible for idle mode of the wireless device 104 as well as paging and tagging procedures including retransmissions. The MME may be involved in the bearer activation/deactivation process and may also responsible for choosing a Signaling Gateway (SGW) for the wireless device 104 at the initial attach and at a time of intra-LTE handover involving Core Network (CN) node relocation. The MME may be responsible for authenticating the wireless device 104 by interacting with a home subscriber server (HSS). Non Access Stratum (NAS) signaling may terminate at the MME and may also be responsible for generation and allocation of temporary identities to the wireless device 104. The MME may check the authorization of the wireless device 104 to camp on the service provider's Public Land Mobile Network (PLMN) and may enforce roaming restrictions on the wireless device 104. The MME may be a termination point in the wireless network 104 for ciphering/integrity protection for NAS signaling and may handle the security key management. The MME may also provide a control plane function for mobility between LTE and 2G/3G access networks with an S3 interface terminating at the MME from the Serving GPRS Support Node (SGSN). The MME may also terminate an S6a interface towards the home HSS for the wireless device 104.

The SGW may be implemented as a network component responsible for transferring signaling messages (i.e. information related to call establishment, billing, location, short messages, address conversion, and other services) between Common Channel Signaling (CCS) nodes that communicate using different protocols and transports.

In one aspect, the wireless network 104 may include the home subscriber server (HSS), or user profile server function (UPSF). The HSS may be a master user database that supports IP Multimedia Core Network Subsystem (IMS) network entities. It may contain the subscription-related information (subscriber profiles), performs authentication and authorization of the user, and can provide information about the subscriber's location and IP information. In other aspects, the wireless network 102 may be implemented without the home subscriber server (HSS).

In one aspect, the wireless network 102 may include a public data network (PDN) gateway (PDN GW). The PDN GW may contain devices such as protocol translators, impedance matching devices, rate converters, fault isolators, or signal translators as necessary to provide system interoperability. The PDN GW may also require the establishment of mutually acceptable administrative procedures between networks.

The PDN may be a circuit-switched or packet-switched network that can transmit data in digital form. The PDN may provide any of X.25, frame relay, cell relay (ATM), or the like services. Access to a PDN generally includes a guaranteed bandwidth, known as the committed information rate (CIR).

The wireless network 102 may include an S5/S8 interface that may be used within the Evolved Packet Core (EPC) for LTE. The S5 interface may provide user plane tunneling and tunnel management between a serving GW and PDN GW. It may be used for Serving GW relocation due to the wireless device 104 mobility and if the serving GW needs to connect to a non-collocated PDN GW for the required PDN connectivity.

The wireless network 102 may further include an Online Charging System (OCS). The OCS may be a system allowing a communications service provider to charge their customers, in real time, based on service usage. The OCS may communicate with a billing component.

The wireless network 104 may further include a Policy and Charging Rules Function (PCRF). The PCRF may be a software node designated in real-time to determine policy rules in a multimedia network. In some aspects, the PCRF may be a policy tool. The PCRF may be a component that operates at the network core and accesses subscriber databases and other specialized functions, such as a charging system, in a centralized manner. The PCRF may be part of the network architecture that aggregates information to and from the wireless network 102, operational support systems, and other sources (such as portals) in real time, supporting the creation of rules and then automatically making policy decisions for each subscriber active on the network. The PCRF may communicate with a billing component.

The Customer Relationship Management (CRM) may be an integrated management information system that is used to schedule, plan, and control the activities for the wireless network 102. The CRM may include hardware, software, and networking tools to improve customer tracking and communication.

In some aspects, the wireless network 104 may include an S8 interface. The S8 interface may provide an inter-PLMN reference point providing user and control plane between the Serving GW in the VPLMN and the PDN GW and the HPLMN. S8 is the inter PLMN variant of S5. In some aspects, the wireless network 102 may include Gx signaling. The Gx signaling may provide an on-line policy interface between the GGSN and the charging rules function (CRF). It may be used for provisioning service data flow based on charging rules. The Gx signaling may utilize the diameter protocol. In some aspects, the wireless network 102 may include Gy signaling. The Gy signaling may be an on-line charging interface between the GGSN and the online charging system (OCS). The Gy signaling may utilize the diameter protocol.

Accordingly, the disclosure has set forth a SIM lock mechanism implementing SIM Lock functionality. Once the SIM card is inserted into a device for the first time, the SIM card can automatically read and store an electronic serial number of the wireless device in memory such that no additional systems are needed to store this value. If the SIM card that has a stored value is ever inserted into another device and the device value does not match the stored value, the SIM will not allow a network connection. Numerous applications can utilize the disclosed SIM lock functionality. In one aspect, the SIM Lock functionality may be implemented in IoT devices. In this regard, with SIM Lock functionality companies could rest assured that their SIMs could only be used in their devices. In other aspects, organizations can limit the ability for a user to remove the SIM from the authorized mobile device implementing MDM and install the SIM in a non-authorized personal mobile device, which is not implementing MDM. Other implementations are contemplated as well and are within the spirit and scope of the disclosure.

For the purposes of this disclosure a computer readable medium stores computer data, which data can include computer program code that is executable by a SIM processor 208 of the SIM card 112, a processor 114 of the wireless device 104, and/or the like, in machine-readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any process or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a process, algorithm, or module may reside as one or any combination or set of codes and/or instructions on a computer readable medium or machine-readable medium, which may be incorporated into a computer program product.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wdeband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various aspects of the disclosure, the processes described herein are intended for operation with dedicated hardware implementations including, but not limited to, PCs, PDAs, SIM cards, semiconductors, application specific integrated circuits (ASIC), programmable logic arrays, cloud computing devices, and other hardware devices constructed to implement the processes described herein. In a particular aspect, the SIM lock mechanism 199 may be implemented as a hardware unit.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The term text message or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a process of delivering news and entertainment content including videos, pictures, text pages, and ringtones. MMS can be used within the context of the present disclosure for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The term voice or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The term data as utilized herein includes mobile broadband or wireless Internet access delivered through mobile phone towers over a communication channel as defined herein to computers, mobile phones, wireless devices, and other digital devices as defined herein using portable modems. Some mobile services allow more than one device to be connected to the Internet using a single cellular connection using a process called tethering.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Generally, companies that provide post-paid wireless services are wireless carriers or Mobile Network Operators (MNO) that maintain and control their own wireless networks. An MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services, which allow subscribers to connect a telephone to a carrier through a wireless telephone base station. The teachings of the disclosure herein are applicable to both MNO and MVNO implementations of a wireless services. In one aspect, the SIM lock mechanism 199 may be implemented by an organization utilizing wireless devices that utilize service from an MVNO.

In an aspect, the disclosure may be web-based. For example, a server may operate a web application to allow the disclosure to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

While the system and process have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A subscriber identity module (SIM) card, comprising:
a memory; and
a processor configured to:
interrogate a first wireless device in which the SIM card is initially inserted;
obtain first information identifying the first device from the first device;
during an initialization after the initial insertion, emit a signal or message indicating a warning;
responsive to a user confirming via a user interface (UI) after the warning is indicated, store the obtained first information at the memory;
during another initialization after another insertion at a second wireless device, interrogate the second wireless device in which the SIM card is subsequently inserted;
obtain second information identifying the second device from the second device;
retrieve, from the memory, the responsively stored first information;
determine (i) whether the first device is different from the second device by detecting whether the obtained second information matches the retrieved information and (ii) whether the SIM card has been previously registered; and
responsive to the determinations (i) that the first and second devices are different and (ii) that the SIM card has been previously registered, limit access of the second device to one or more wireless services of a network,
wherein the first information comprises a mobile equipment identifier (MEID), an international mobile station equipment identity (IMEI) number, an electronic serial number (ESN), or a pseudo-ESN (pESN).

2. The SIM card according to claim 1, wherein the one or more wireless services comprise data services, voice services, and text-messaging services.

3. The SIM card according to claim 1, wherein the limitation of the access is implemented as part of a mobile device management (MDM) tool.

4. The SIM card according to claim 1, wherein:
the processor is further configured to send a notification, responsive to the determination that the first and second devices are different; and
the notification comprises a warning message sent over a communication channel indicating use of an unauthorized device.

5. The SIM card according to claim, 1 wherein:
the processor is further configured to display a warning on a display of the second device responsive to the determination that the second device has not been registered to the particular wireless device; and
the limitation of the access is implemented as part of an MDM tool.

6. The SIM card according to claim 1, wherein:
the processor is further configured to implement a SIM lock mechanism that utilizes over the air (OTA) processes for distribution, updates, and/or configuration settings; and
the SIM lock mechanism is implemented as part of an MDM tool.

7. A computer-implemented process, comprising:
interrogating a first wireless device in which a SIM card is initially inserted;
obtaining first information identifying the first device from the first device;
during an initialization after the initial insertion, emit a signal or message indicating a warning;
responsive to a user confirming via a user interface (UI) after the warning is indicated, storing the obtained first information at a memory of the SIM card;
during another initialization after another insertion at a second wireless device, interrogating the second wireless device in which the SIM card is subsequently inserted;
obtaining second information identifying the second device from the second device;
retrieving, from the memory, the responsively stored first information;
determining (i) whether the first device is different from the second device by detecting whether the obtained second information matches the retrieved information and (ii) whether the SIM card has been previously registered; and
responsive to the determinations (i) that the first and second devices are different and (ii) that the SIM card has been previously registered, limiting access of the second device to one or more wireless services of a network,
wherein the first information comprises an MEID, an IMEI number, an ESN, or a pESN.

8. The process according to claim 7, wherein the one or more wireless services comprise data services, voice services, and text-messaging services.

9. The process according to claim 8, wherein the limitation of the access is implemented as part of an MDM tool.

10. The process according to claim 7, further comprising:
implementing a SIM lock mechanism that utilizes OTA processes for distribution, updates, and/or configuration settings;
wherein the implementation of the SIM lock mechanism is part of an MDM tool.

11. The process according to claim 7, further comprising:
responsive to the determination that the first and second devices are different, sending a notification,
wherein the notification comprises a warning message sent over a communication channel indicating use of an unauthorized device.

12. The process according to claim 7, further comprising:
displaying a warning on a display of the second device, responsive to the determination that the second device has not been registered to the particular wireless device.

* * * * *